Jan. 16, 1940. J. H. DUNN 2,187,020
BICYCLE FRAME AND METHOD OF MAKING SAME
Filed Oct. 4, 1937
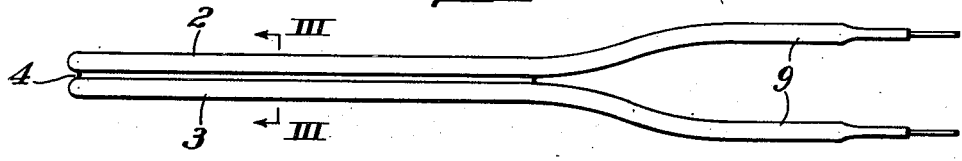
Fig. 2.
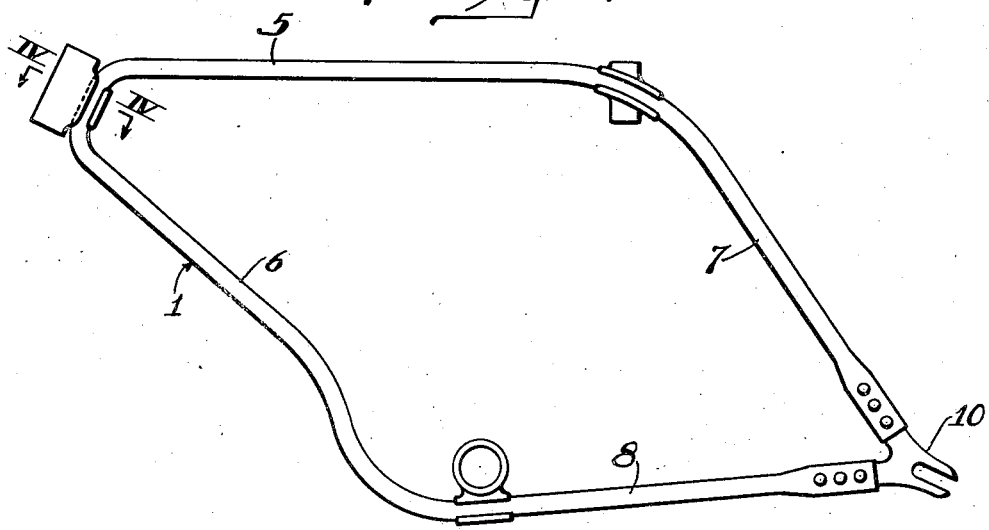
Fig. 1.
Fig. 3.
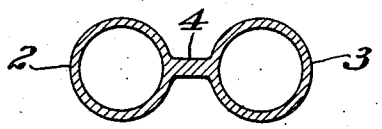
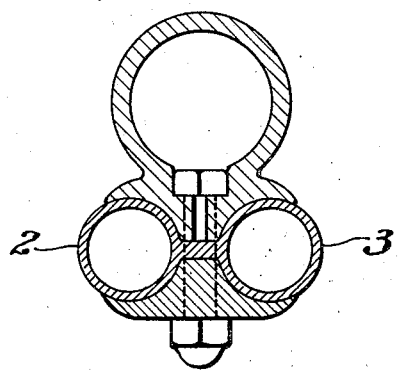
Fig. 4.
INVENTOR.
JOHN H. DUNN.
BY
ATTORNEY.

Patented Jan. 16, 1940

2,187,020

UNITED STATES PATENT OFFICE 2,187,020

BICYCLE FRAME AND METHOD OF MAKING SAME

John H. Dunn, Springdale, Pa., assignor to Aluminum Company of America, Pittsburgh, Pa., a corporation of Pennsylvania Application October 4, 1937, Serial No. 167,197

4 Claims. (Cl. 29—176)

This invention relates in general to frames for bicycles, and more particularly to the formation of such frames in one piece.

The object of the invention is to present a bicycle frame which is relatively simple to manufacture, which is free of the numerous joints found in the frames of today, which has exceedingly easy riding qualities due to the novel construction of the same, and which is durable and capable of withstanding the demands placed upon such structures.

Briefly, the invention resides in constructing the frame from a section of integrally joined double tubing, by forming the section to the desired shape, removing a part of the metal which unites the tubes, and separating the tubes to provide for the reception of the rear wheel in the frame. The frame proper may be regarded as being a closed loop and is formed from one piece.

Prior to my invention, frames for bicycles, whether they were constructed from wood, flat metal straps, or of tubes, had one common disadvantageous feature in that the plies of wood, the metal straps, or the tubes had to be joined together by bolts, or by brazing or welding strengthening or spacing members between the frame members. Wherever such a jointure occurred, there was to be found a possible point of weakness in the frame. In addition, to construct a frame according to the prior art necessitated considerably more time and effort due to the number of individual parts which had to be assembled, whereas a frame constructed according to my invention, being of one piece, eliminates all these features of the prior art.

In the accompanying drawing, Fig. 1 is a side elevation of a bicycle frame;

Fig. 2 is a plan view, with seat bracket and front fork receiving tube removed;

Fig. 3 is a sectional view taken on line III—III of Fig. 2; and

Fig. 4 is a detailed view taken on line IV—IV of Fig. 1.

Referring to Fig. 1, reference character 1 denotes the main frame of the bicycle. The frame, in its preferred form, is constructed from a section composed of integrally joined parallel tubes and formed to the general contour shown in Fig. 1. Although tubing has been shown as the preferred form of my invention, it is manifest that any parallel members integrally joined my be likewise used. As best depicted in Fig. 3, tubes 2 and 3 are integrally joined as, for instance, by a web 4 throughout the entire length of the frame except where the tubes have been separated, as will hereinafter be explained. The section from which the frame is made may be fabricated in any suitable manner, as by rolling to shape or by extrusion.

The horizontal top part 5 of the frame and the upwardly sloping front part 6 are novel in that the tubes 2 and 3 are integrally joined throughout this portion of the frame. In the downwardly sloping member 7 and in the substantially horizontal bottom 8 the web 4 is removed and the tubes 2 and 3 separated to form forks for the reception of the rear wheel. Such a fork is designated by reference character 9, the fork formed in part 8 not being shown. The outer ends of the forks are flattened for the reception of the members 10, the latter being secured in the reduced end portions by welding or in a similar manner.

It will be noted that no bracing member is shown between the seat bracket and the crank hanger. This feature makes for easier riding in that the frame as a whole is more flexible. However, if such a bracing member is desired, it could be used, in which case its ends would be received and secured in suitable sockets forming part of the crank hanger and seat bracket.

The various fittings for reception of the front fork, seat, etc., may be secured to the frame in a manner as depicted in Fig. 4.

While the invention has been described hereinabove with reference to certain embodiments thereof which are now preferred, it will be understood that it may be otherwise embodied without departing from the spirit of the invention or the scope of the appended claims.

I claim:

1. The method of constructing a bicycle frame which comprises forming a section consisting of a pair of parallel members having a web therebetween, said members and web being in one piece, removing a part of said web and spreading the members to provide a rear wheel receiving portion in said frame.

2. The method of constructing a bicycle frame which comprises forming a section consisting of horizontally disposed parallel tubes having a web therebetween, said tubes and web being in one piece, removing a part of said web and spreading the webless part of said section to provide in the same a rear wheel receiving portion.

3. A bicycle frame comprising horizontally disposed parallel tubes bent to form a curve of approximately elliptical shape, said tubes having a web therebetween, said tubes and web being in one piece, and a rear wheel receiving portion in said frame formed by removing a part of said web and spreading the webless section of said frame.

4. A bicycle frame comprising parallel tubes having a web therebetween, said tubes and web being in one piece, a rear wheel receiving portion in said frame, said portion being formed by removing a part of said web and spreading the webless tubes of said frame.

JOHN H. DUNN.

CERTIFICATE OF CORRECTION.

Patent No. 2,187,020. January 16, 1940.

JOHN H. DUNN.

It is hereby certified that error appears in the above numbered patent requiring correction as follows: In the grant, line 2 thereof, name of the assignee, for "ALUMINUM COMPANY OF AMERICAN" read ALUMINUM COMPANY OF AMERICA, as shown by the record of assignments in this office; page 1, first column, line 52, for the word "my" read may; and that the said Letters Patent should be read with this correction therein that the same may conform to the record of the case in the Patent Office.

Signed and sealed this 27th day of February, A. D. 1940.

(Seal)

Henry Van Arsdale,
Acting Commissioner of Patents.